(12) United States Patent
Alipov et al.

(10) Patent No.: US 10,529,011 B2
(45) Date of Patent: Jan. 7, 2020

(54) METHOD AND SYSTEM OF DETERMINING AN OPTIMAL VALUE OF AN AUCTION PARAMETER FOR A DIGITAL OBJECT

(71) Applicant: YANDEX EUROPE AG, Lucerne (CH)

(72) Inventors: Vyacheslav Vyacheslavovoich Alipov, Tomsk (RU); Andrey Vladimirovich Gulin, Shatura (RU); Andrey Sergeevich Mishchenko, Troitsk (RU)

(73) Assignee: YANDEX EUROPE AG, Lucerne (CH)

( * ) Notice: Subject to any disclaimer, the term of this patent is extended or adjusted under 35 U.S.C. 154(b) by 509 days.

(21) Appl. No.: 15/276,918

(22) Filed: Sep. 27, 2016

(65) Prior Publication Data

US 2017/0103451 A1    Apr. 13, 2017

(30) Foreign Application Priority Data

Oct. 12, 2015   (RU) .................................. 2015143316

(51) Int. Cl.
   *G06Q 30/08*   (2012.01)
   *G06Q 30/02*   (2012.01)
(52) U.S. Cl.
   CPC ......... *G06Q 30/08* (2013.01); *G06Q 30/0283* (2013.01)
(58) Field of Classification Search
   CPC .................................................. G06Q 30/0283
   USPC .......................................................... 705/26.3
   See application file for complete search history.

(56) References Cited

U.S. PATENT DOCUMENTS

| 8,831,987 | B2 | 9/2014 | Knapp et al. |
| 2003/0055773 | A1 | 3/2003 | Guler et al. |
| 2003/0093355 | A1 | 5/2003 | Issa |
| 2006/0271438 | A1 | 11/2006 | Shotland et al. |
| 2009/0063268 | A1 | 3/2009 | Burgess et al. |

(Continued)

FOREIGN PATENT DOCUMENTS

| RU | 2161891 C1 | 1/2001 |
| RU | 78342 U1 | 11/2008 |
| WO | 2014005018 A2 | 1/2014 |

OTHER PUBLICATIONS

Russian search report from RU patent application No. 2015143316 dated Oct. 18, 2016.

(Continued)

*Primary Examiner* — Alexis M Casey
(74) *Attorney, Agent, or Firm* — BCF LLP

(57) ABSTRACT

There is disclosed a method of determining an optimal value of an auction parameter for a digital object. The method comprises using: an indication of a digital object, an auction parameter associated with the digital object and an environment feature at the respective moment of time to execute an offline training of a machine learning algorithm to predict an optimal value of auction parameters for a plurality of digital objects, the plurality of digital objects being associated with the interaction history of the first portion of users. The method further comprises applying the machine learning algorithm to determine a first optimal value of an auction parameter for a plurality of digital objects associated with the second portion of users and using such determined value for determining a digital object being relevant to the request from a user from the second portion of users.

19 Claims, 4 Drawing Sheets

(56) References Cited

U.S. PATENT DOCUMENTS

| | | |
|---|---|---|
| 2009/0083098 A1 | 3/2009 | Schwarz |
| 2009/0164298 A1 | 6/2009 | Glohovsky et al. |
| 2010/0121679 A1 | 5/2010 | Mcafee |
| 2012/0173344 A1 | 7/2012 | Zhang et al. |
| 2014/0000614 A1 | 1/2014 | Chang |
| 2014/0006144 A1 | 1/2014 | Pardoe et al. |
| 2014/0006170 A1* | 1/2014 | Collette ............ G06Q 30/0277 705/14.71 |
| 2014/0006172 A1 | 1/2014 | Pardoe et al. |
| 2014/0017258 A1 | 1/2014 | Mitteness et al. |
| 2014/0058849 A1 | 2/2014 | Saifee et al. |
| 2014/0089106 A1 | 3/2014 | Jordan et al. |
| 2014/0172587 A1 | 6/2014 | Somech et al. |
| 2014/0365317 A1 | 12/2014 | Goel |
| 2015/0127469 A1 | 5/2015 | Cui |
| 2015/0134462 A1 | 5/2015 | Jalali et al. |
| 2015/0206196 A1 | 7/2015 | Karande et al. |

OTHER PUBLICATIONS

Mohri, Learning Theory and Algorithms for Revenue Optimization in Second-Price Auctions with Reserve, Proceedings of the 31st International Conference on Machine Learning, Beijing, China, 2014. JMLR: W&CP vol. 32. Copyright 2014 by the author(s), 9 pages.

* cited by examiner

METHOD AND SYSTEM OF DETERMINING AN OPTIMAL VALUE OF AN AUCTION PARAMETER FOR A DIGITAL OBJECT

CROSS-REFERENCE

The present application claims priority to Russian Patent Application No. 2015143316, filed Oct. 12, 2015, entitled " Способ И СИСТЕМА ОПРЕДЕЛЕНИЯ ОПТИМАЛЬНОГО ЗНАЧЕНИЯ ПАРАМЕТРА АУКЦИОНА ДЛЯ ЦИФРОВОГО ОБЪЕКТА ", the entirety of which is incorporated herein by reference.

FIELD OF THE TECHNOLOGY

The present technology relates to Internet auctions of all kinds and, more specifically, to methods and systems of determining an optimal value of an auction parameter for a digital object.

BACKGROUND

Today various global or local communications networks (the Internet, the World Wide Web, local area networks and the like) offer a user a vast amount of information, hosted on the different resources.

Generally speaking, a given user may access a resource on a communication network by two principle means. The given user can access a particular resource directly, either by typing an address of the resource (typically an URL or Universal Resource Locator, such as www.webpage.com) or by clicking a link in an e-mail or in another web resource.

Alternatively, the given user may conduct a search using a search engine to locate a resource of interest. The latter is particularly suitable in those circumstances, where the given user knows a topic of interest, but does not know the exact address of the resource the user is interested in.

Many search engines are available for the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights.

Majority of search engines includes advertisements (ads), placed on search engine results pages SERP or presented via other objects (such as web-sites) for paid publications. Generally, an advertiser pays for an amount of transfers to his ad, performed by users (so-called pay-per-click). To determine an amount of the payment-per-click for different ads all major search engines use ad auctions.

Advertisers enter ad text, keywords and bids into an ad management system. When a user sends a query to the search engine, the system finds a set of ads with keywords that match or substantially match the query and determines which ad(s) should be displayed and where exactly. When the search results and ads are displayed, the user may click on an ad for further information. In this case, the advertiser pays the search engine an amount determined by the bids of the other competing advertisers. The expected revenue received by the search engine is the price per click (also called cost-per-click (CPC) or cost-per-action (CPA)) times the expected number of clicks (may be expressed in a click-through-rate (CTR) parameter).

In general, the search engine would like to sell the most prominent positions—those most likely to receive clicks— to those ads that have the highest expected revenue. To accomplish this, the ads are ranked by bid multiplied by click through rates and those ads with the highest expected revenue are shown in the most prominent positions.

Sometimes the highest bidder is required to pay not the highest bid amount but the second highest bid made by the second highest bidder. This type of auction is called the Second Price Auction, as opposed to the First Price Auction where the winner pays the highest bid amount. Thus in order for the ad to be shown at the top and best slot the highest bidding advertiser pays the second highest price, which is lower than the highest bid amount. The discounted price payed by the winner of the auction is referred to as "reserve price".

Known solutions that contemplate that the reserve price to be determined as a function of an advertiser's bid or as a history of bids of the advertiser are believed to be flawed as they allow advertisers to negatively influence the market and intentionally decrease the reserve price, thus forming bad market equilibrium states (also known as Nash equilibria).

US patent application US 2014/0006144, published 2 Jan. 2014 (Pardoe et al.) teaches systems and computer-implemented methods for calculating a suggested reserve price associated with an opportunity to realize an online advertisement. In some implementations, data associated with historical online advertisement auctions are clustered based on a reference opportunity for realizing an online advertisement, wherein each historical online advertisement auction of the cluster is associated with a first bid price of higher value and a second bid price of lower value; a dominance relationship between a distribution of the first bid prices of the cluster and a distribution of the second bid prices of the cluster is determined; a reserve price associated with the cluster based on the dominance relationship is calculated; and the reserve price is stored as a suggested reserve price to realize an online advertisement, wherein the suggested reserve price is associated with the reference opportunity that is associated with the cluster.

US patent application US 2014/0172587, published 19 Jun. 2014 (Somech et al.) teaches systems, methods, and computer storage media having computer-executable instructions embodied thereon that dynamically set floor prices in a second price auction for impressions or events. Advertiser bids for the impressions or events are received by the computer system and used to create a statistical distribution. The advertiser with the highest bid for an impression or event is identified. The statistical distribution excludes bids received from the advertiser having the highest bid. The computer system sets a floor price for the impression or event. The floor price is based on the statistical distribution. The advertiser is charged the maximum of the floor price or the second highest bid received from another advertiser for the same impression. The advertisement associated with the advertiser having the highest bid is selected for display in a webpage that corresponds to the impression or event.

SUMMARY

It is an object of the present technology to ameliorate at least some of the inconveniences present in the prior art.

The present technology is based on an inventor(s)' appreciation that there is at least one technical problem of the known state of the art; the problem relates to heavy server load when performing on-line algorithms for calculating a reserve price. Thus, to ensure fast processing user requests, the known methods require applying computing systems with higher performance.

In accordance with a first broad aspect of the present technology, there is provided a method of determining an optimal value of an auction parameter for a digital object; the method executable at an auction server, associated with the storage; the auction server hosting an auction service. The method comprises: acquiring from a storage, interaction history data of a first portion of users of the auction service, and interaction history data of a second portion of users of the auction service; the interaction history data including, for each respective interaction, at least: an indication of a digital object, an auction parameter associated with the digital object and a feature of environment at the respective moment of time of the respective interaction; based on the interaction history data associated with the first portion of users, executing an offline training of a machine learning algorithm to predict the optimal value of auction parameters for a plurality of digital objects, the plurality of digital objects being associated with the interaction history of the first portion of users; applying the machine learning algorithm to determine a first optimal value of an auction parameter for a plurality of digital objects associated with the second portion of users; storing the first optimal value of auction parameter for the plurality of digital objects; responsive to receiving a request to the auction service by the auction server, determining a digital object being relevant to the request; determining a user associated with the digital object; responsive to the user associated with the digital object being from the second portion of users, applying to the digital object the first optimal value of the auction parameter.

In some implementations of the method, the method further comprises setting a minimal number of users in the first portion of users of the auction service for the acquiring interaction history data.

In some implementations of the method, the method further comprises setting a minimal number of users in the second portion of users of the auction service for the acquiring interaction history data.

In some implementations of the method, the number of users in the first portion of users of the auction service is equal to the number of users in the second portion.

In some implementations of the method, during the acquiring interaction history data, the first and the second portions are presented as a single group of users of the auction service, and wherein prior to the executing the offline training of the machine learning algorithm, the single group of users is divided into the first portion of users of the auction service and the second portion of users of the auction service.

In some implementations of the method, the method further comprises prior to the executing the offline training of the machine learning algorithm, dividing a plurality of digital objects into at least two categories and dividing the first and the second portions of users of the auction service into subsets according to corresponding at least two categories; and wherein the executing the offline training of the machine learning algorithm is based on the interaction history data associated with each distinct subset of the first portion of users; applying the machine learning algorithm to determine a first optimal value of auction parameter for each category of a plurality of digital objects associated with a corresponding subset of the second portion of users; upon receiving by the auction server a request to the auction service responsive to the user associated with the digital object being from the subset of the second portion of users, applying for the digital object the first optimal value of the auction parameter, corresponding to the digital object category.

In some implementations of the method, the method further comprises pre-setting a minimal number of users in each subset.

In some implementations of the method, the method further comprises, responsive to the number of users in a subset being less than the pre-set minimal value, executing the offline training of the machine learning algorithm is performed using the portion of users.

In some implementations of the method, the storage includes a plurality of interaction history data for a plurality of users, and wherein the acquiring interaction history data comprises acquiring a sub-set of data generated at a pre-defined time period, the sub-set of data including for each respective interaction at least: the indication of the digital object, the auction parameter associated with the digital object and the feature of environment at the respective moment of time of the respective interaction.

In some implementations of the method, the interaction history data further includes a spatial position of the digital object at a screen of a computer device.

In some implementations of the method, the interaction history data further includes an indication of a type of the digital object.

In some implementations of the method, the type of the digital object is at least one of: a text, an image, a video, an animation, a button, a form, a hyperlink, an interactive element.

In some implementations of the method, the interaction history data further includes a history of changes of at least one auction parameter over time.

In some implementations of the method, the environment feature includes at least one of: an average bid, 90% bid quantile, a minimal bid, a maximal bid, a probability of a click on the digital object, a relevancy score of the digital object to a search query, an indication of a geographical area, and a search query, in response to which the digital object was shown.

In some implementations of the method, the machine learning algorithm is configured to predict an optimal value of at least one of: a minimal placing price of the auction parameters, and an amnesty threshold for an advertiser.

In some implementations of the method, after storing the first optimal value of the auction parameter for the plurality of the digital objects, the method further comprises updating the optimal value by periodical repetition of steps of the method of claim 1.

In some implementations of the method, the method further comprises, based on the interaction history data associated with the second portion of users, executing training of the machine learning algorithm to predict the optimal value of auction parameters for a plurality of digital objects, the plurality of digital objects being associated with the interaction history of the second portion of users; applying the machine learning algorithm to determine a second optimal value of the auction parameter for the plurality of digital objects associated with the first portion of users; storing the second optimal value of the auction parameter for the plurality of digital objects.

In some implementations of the method, responsive to the user associated with the digital object being from the first portion of users, the method further comprises applying to the digital object the second optimal value of the auction parameter.

In some implementations of the method, after storing the second optimal value of the auction parameter for the plurality of the digital objects, the method further comprises updating the optimal value by periodical repetition of steps of the method of claim 17.

In accordance with another broad aspect of the present technology, there is provided a system for displaying digital objects, the digital objects having been provisioned by users. The system comprises: an auction server coupled to at least one storage, the auction server having a processor, the processor configured to execute stored computer executable instructions to execute an auction service; the storage including interaction history data of the first portion of users of the auction service and interaction history data of the second portion of users of the auction service, the interaction history data including for each respective interaction at least: an indication of a digital object, an auction parameter associated with the digital object and a feature of an environment at the respective moment of time of the respective interaction; the computer executable instructions when executed cause the processor to access the interaction history data of the first and second portions of users of the auction service; a training system configured to: communicate with the auction server; initiate the processor to access the interaction history data; execute training of a machine learning algorithm based on the interaction history data associated with the first portion of users of the auction service, a plurality of digital objects being associated with the interaction history of the first portion of users of the auction service; a determination module configured to: communicate with the training system; apply the machine learning algorithm for determining a first optimal value of an auction parameter for the plurality of digital objects, the plurality of digital objects being associated with the second portion of users of the auction service; store in the storage the first optimal value of the auction parameter for the plurality of digital objects; an auction server is configured to: communicate with at least one computer device with a screen; receive a query transmitted by the computer device for providing a particular digital object; executing computer executable instructions, which instructions when executed cause the auction server to: access a storage system for determining the particular digital object relevant to the query; determine a user associated with the particular digital object; determine if the user associated with the particular digital object belongs to the second portion of users of the auction service; apply the first optimal value of the auction parameter to the particular digital object; and provide the particular digital object for displaying the particular digital object on the screen of the computing device.

In some implementations of the system, the system further comprises: at least one additional storage.

In some implementations of the system, the interaction history data of the first portion of users of the auction service and the interaction history data of the second portion of users of the auction service are stored in the different storages.

In some implementations of the system, the training system is further configured to: based on the interaction history data associated with the second portion of users of the auction service, execute training of the machine learning algorithm using the plurality of the digital objects associated with the interaction history of the second portion of users of the auction service; and wherein the determination module is further configured: to apply the machine learning algorithm for determining a second optimal value of the auction parameter for the plurality of digital objects, the plurality of digital objects being associated with the first portion of users of the auction service; and to store in the storage system the second optimal value of the auction parameter for the plurality of digital objects.

In some implementations of the system, the auction server is further configured to execute computer executable instructions, which instructions when executed cause the auction server to: determine if the user associated with the digital object belongs to the first portion of users of the auction; and responsive thereto to apply the second optimal value of the auction parameter for the digital object.

In the context of the present specification a "server" is meant to include a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both cases are included within the expression "at least one server".

In the context of the present specification, a "client device" (or a "computing device") is meant to include any computer hardware that is capable of running software appropriate to the relevant task at hand. The electronic devices may be implemented, inter alia, as personal computers (desktops, laptops, netbooks, etc.), smartphones, tablets, as well as network equipment (routers, switches, or gateways). It should be noted, that a device acting as an electronic device in the present context is not precluded from acting as a server to other electronic devices. The use of the expressions "an electronic device" does not preclude multiple electronic devices being used in receiving/sending, carrying out or causing to be carried out any task or request, or the consequences of any task or request, or steps of any method described herein.

In the context of the present specification, the words "first", "second", "third", etc. have been used as ordinal numerals only for the purpose of allowing for distinction between the nouns that they modify from one another, and not for the purpose of describing any particular data relationship between those nouns. Further, reference to a "first" element and a "second" element does not preclude the two elements from being the same actual real-world element. Thus, for example, in some instances, a "first" and a "second" portions of users may be the same portion of users, and in other cases they may be different portions of users.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, "information" includes information of any nature or kind whatsoever capable of being stored in a database. Thus information includes, inter alia, audiovisual works (images, movies, sound records, presentations etc.), data (location data, numerical data, etc.), text (descriptions, ads, messages, etc.), documents, spreadsheets, etc.

In the context of the present specification, an "indication of" a digital object may be the digital object itself or a pointer, reference, link, or other indirect mechanism enabling the recipient of the indication to locate a network, memory, database, or other computer-readable memory location from which the digital object may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient of that an indication of the digital object will take the form of a database key for an entry in a particular table of a predetermined database containing the digital object, then the sending of the database key is all that is required to effectively convey the digital object to the recipient, even though the digital object itself was not transmitted as between the sender and the recipient of the indication.

In the context of the present specification, the expression "an auction service" means a computer program and can include, without being limitative, on-line services for realization of goods and services and/or on-line services of contextually targeted ads, in which services a payment (for example, so-called pay-per-click) for placing ads is defined by an auction.

Among actual examples of on-line services for realization of goods and services auctions, there are known, for instance, e-bay (www.e-bay.com) and Amazon (www.amazon.com).

Among actual examples of on-line services of contextually targeted ads there are known, for instance, Google ADwords (adwords.google.com) and Yandex.Direct (direct.yandex.ru).

In the context of the present specification, "storage" is intended to include storage medium or memory of any nature and kind whatsoever, including RAM, ROM, disks (CD-ROMs, DVDs, floppy disks, hard drivers, etc.), USB keys, solid state-drives, tape drives, etc.

Implementations of the present technology have at least one of the above-mentioned object and/or aspects, but do not necessarily have all of them.

Additional and/or alternative features, aspects, and advantages of embodiments of the present disclosure will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be described below. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Figure 1:
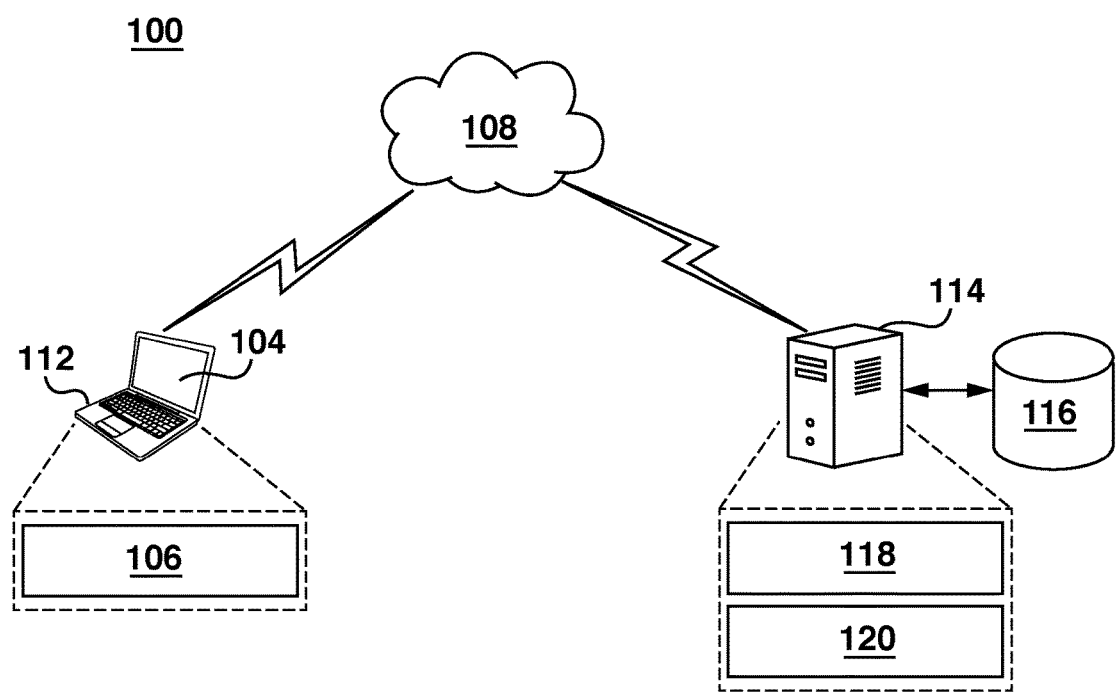
FIG. 1 is a schematic diagram depicting a system, the system being suitable for use with implementations of the present technology.

FIG. 1 depicts a schematic diagram of a network computer system 100 (or, simply, the computer system 100 or the system 100). It is to be expressly understood that the network computer system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to computer systems 100 may also be described below. This is done merely as an aid to understanding, and, again, not to define the scope or set forth the bounds of the present technology. These modifications are not an exhaustive list, and, as a person skilled in the art would understand, other modifications are likely possible. In addition it is to be understood that the computer system 100 may provide in certain instances simple implementations of the technology, and that where such is the case they have been presented in this manner as an aid to understanding. As persons skilled in the art would understand, various implementations of the present technology may be of a greater complexity.

FIG. 1 depicts the system 100 implemented in accordance with non-limiting embodiments of the present technology. The system 100 includes an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered, or the like.

The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). The general implementation of the electronic device 102 is known in the art and, as such, will not be described here in detail. Suffice it to say that the electronic device 102 comprises a user input interface (such as a keyboard, a mouse, a touch pad, a touch screen and the like) for receiving user inputs; a user output interface 104 (such as a screen, a touch screen, a printer and the like) for providing visual or audible outputs to the user; a network communication interface (such as a modem, a network card and the like) for two-way communication over a communication network 108; and a processor coupled to the user input interface, the user output interface and the network communication interface, the processor being configured to execute various routines, including those described herein below. To that end the processor may store or have access to computer readable instructions which instructions, when executed, cause the processor to execute the various routines described herein. For example, to be more specific, the electronic device 102 is implemented as a laptop, such as for example, Apple™ MacBook Pro™.

The electronic device 102 includes hardware and/or software (or a combination thereof) to execute one or more applications and, more specifically, an application 106. The application 106 can be implemented as an Internet browser, the Internet browser configured to provide an access to different resources over a communication network 108. As another example, the application 106 can be implemented as a dedicated application, the dedicated application configured to provide an access to a specific resource over the communication network 108. It should be noted that any suitable web browser can be used as the application 106, the non-limiting examples of web browsers being as follows: Yandex™ browser, Google Chrome™, Mozilla Firefox™, Microsoft™ Internet Explorer™, Safari™, and the like. A web browser can provide a user access to a non-limited number of web resources representing an auction service in one form or another. Alternatively or additionally, the electronic device 102 can execute the dedicated application 106, the dedicated application 106 providing a user access to one of more specific web resources representing an auction service in one form or another.

The system 100 includes the above-mentioned communication network 108. In some non-limiting implementations, the communication network 108 can be implemented as the Internet. In other implementations, the communication network 108 can be implemented alternatively as a wide area network or local area network, private network and the like.

The system 100 further includes at least one auction server 114 connected to the communication network 108 and at least one storage 116 associated with the auction server 114. The auction server 114 may be implemented as a conventional computer server. In an example of an embodiment of the present technology, the auction server 114 may be implemented as a Dell™ PowerEdge™ Server running the Microsoft™ Windows Server™ operating system. Needless to say, the auction server 114 may be implemented in any other suitable hardware and/or software and/or firmware or a combination thereof. In the depicted non-limiting embodiment of present technology, the auction server 114 is a single server. In alternative non-limiting embodiments of the present technology, the functionality of the auction server 114 may be distributed and may be implemented via multiple servers.

The implementations of the server 114 are well known in the art. However, briefly speaking, the auction server 114 comprises a communication interface (not depicted) structured and configured to communicate with various entities (such as the electronic device 102, for example, and other devices potentially coupled to the communication network 108) via the communication network 108. The auction server 114 further includes at least one computer processor (not shown), operationally connected with the communication interface and structured and configured to execute the various routines described herein.

The auction server 114 is communicatively coupled to or otherwise has access to at least one storage 116. Though the storage 116 is separated from the auction server 114, in alternative non-limiting embodiments, functionality of the storage 116 can be implemented by the auction server 114. In alternative non-limiting embodiments of the present technology, the functionality of the storage 116 may be distributed and may be implemented via multiple storages 116. In an embodiment of the present technology the system 100 may include at least one additional storage 116.

The general purpose of the storage 116 is storing interaction history data of users of the auction service. Further below with reference to FIG. 3 the storage 116 will be described in details. A history of interactions of users with the auction service can be stored in the storage 116 as one or more databases 300. A specific number of storages 116 and also a specific number of databases 300 in each storage 116 can be selected based on parameters of the system 100, a size and type of stored data, etc. Technologies for distributing data among several storages and several databases are known in the art and, therefore, the detailed description thereof is omitted. It should be mentioned that several storages 116 can store identical data for providing fast operation of the system and increasing reliability of data storing. It should be understood that there can be other non-limiting implementations of the storage 116. In order to simplify the description presented herein below, the configuration of the storage 116 has been greatly simplified. It is believed that those skilled in the art will be able to appreciate implementational details for the storage 116 and for components thereof that may have been omitted for the purposes of simplification of the description.

The database 300 (FIG. 3) can store data, for example, as tables 302 and 304. Generally, the tables 302 and 304 include user ID 310 and at least three parameters of a user interaction history: an indication of a digital object 320, an auction parameter 330 and an environment feature 340. In some implementations the tables 302 and 304 can further include other parameters of the user interaction history, for example, at least one of: an indicator of a type of a digital object, a spatial position of the digital object at a screen of a computer device, a value of probability of a click on the digital object, a value of relevance of the digital object to a search query (relevance score), an indication of a geographical area, and a search query, in response to which the digital object was shown. Though in the illustrative example in FIG. 3 the database 300 includes two tables 302, 304, in other implementations the database 300 can include, for example, one common table or, on the contrary, more than two tables.

In some implementations of the present technology, the tables 302, 304 can further include indications of changes of at least one auction parameter over time.

Figure 3:
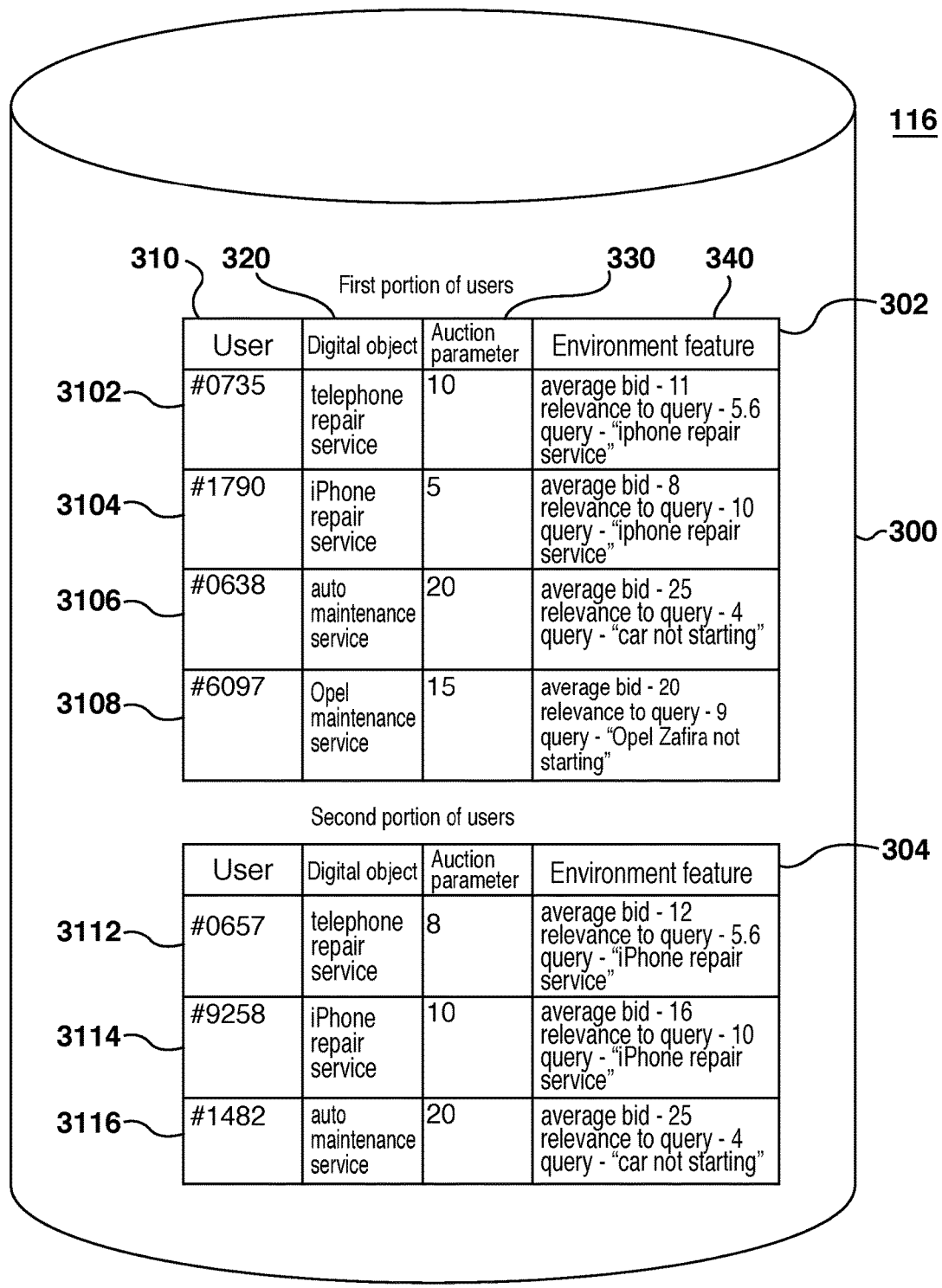
FIG. 3 is an illustrative example of an implementation of a storage for a case of contextual ad on-line auction, the storage being part of the system of FIG. 1 the storage being implemented in accordance with some non-limiting embodiments of the present technology.

In a non-limiting embodiment of the present technology, the table 302 stores an indication of an interaction history data of a first portion of users of an auction service, and in the table 304 stores an indication of an interaction history data of a second portion of users of the auction service. The database 300 can include only one table in which the interaction history data of the first and the second portions of users of the auction service are stored simultaneously. A division into portions can be performed preliminary in the storage 116 as it is shown in FIG. 3 by the auction server 114 prior to offline training a machine learned algorithm, as will be described in details further below in the description of non-limiting embodiments of a method contemplated herein. A principle of division of users of the auction server into the first and the second portions of users of the auction server is not particularly limited. Thus, for example, the users can be divided randomly to form equal or non-equal numbers of users or in a pre-defined order, for example, as odd and even users.

For the illustrative purpose, the table 302 of the interaction history data of the first portion of users includes only four entries: 3102, 3104, 3106, and 3108. In addition, the table 304 of the interaction history data of the second portion of users includes only three entries: 3112, 3114, and 3116. Naturally, in reality the tables 302 and 304 can include any other number of entries. Thus, examples provided herein above can be applied to a greater number of entries in the tables 302 and 304. As non-limiting examples, the table 302 can include 100,000 entries and the table 304 can include 80,000 entries. As another example, the table 302 can include 10,000 entries and the table 304 can include 1 million entries. It should be noted that the number of entries in the tables can be equal or non-equal between the table 302 and the table 304.

The processor of the auction server 114 is configured, when executing instructions, to access the interaction history data of the first portion of users (the table 302) and the interaction history data of the second portion of users (the table 304) from the storage 116.

The auction server 114 is further configured to receive, store, delete, and transfer data to/from the storage 116.

In accordance with the present technology the system 100 includes a training system 118. The training system 118 includes machine readable instructions that, when executed, cause the processor of the auction server 114 to: access the interaction history data associated with the first portion of users, the data being stored in the storage 116; execute an offline training of the machine learning algorithm on the basis of the interaction history data associated with the first portion of users of the auction service.

System 100 includes a determination module 120. The determination module 120 includes machine readable instructions that, when executed, cause the processor of the auction server 114 to: communicate with the training system 118; apply the machine learning algorithm for determining an optimal value of an auction parameter for a plurality of digital objects, the plurality of digital objects being associated with the second portions of users of the auction service; store in the storage 116 the optimal value of the auction parameter for the plurality of digital objects.

In the illustrative example of the system 100 shown in FIG. 1 the training system 118 and the determination module 120 are modules of the auction server 114. However, in alternative non-limiting implementations, at least one of: the training system 118 and the determination module 120 can be implemented as a respective distinct one of: a distinct training server (not shown) and a determination server (not shown). In this case the training server and/or the determination server will be associated with the auction server 114. Thus, the auction server 114 includes or has an access to the training system 118 and the determination module 120.

The auction server 114 is configured to: communicate with at least one electronic device 102, the electronic device 102 having a screen 104) over the communication network 108. The auction server 114 is configured to: receive a query transmitted by the electronic device 102 for providing a digital object; executing instructions, programmed to: access a storage system for determining the digital object relevant to the query; determine a user associated with the digital object; determine the fact that user associated with the digital object belongs to the second portions of users of the auction service; apply the first optimal value of the auction parameter for the digital object; and provide the digital object for displaying the digital object on the screen 104 of the electronic device 102.

In an embodiment of the present technology the computer system 100 is further configured to: based on the interaction history data associated with the second portion of users of the auction service, executing an offline training of the machine learning algorithm. In response to the plurality of the digital objects is associated with the interaction history of the second portion of users of the auction service, the determination module 120 is further configured to: apply the trained machine learning algorithm for determining a second optimal value of the auction parameter for the plurality of digital objects, the plurality of digital objects being associated with the first portions of users of the auction service; and store in the storage system 116 the second optimal value of the auction parameter for the plurality of digital objects.

In an implementation of the present technology, the auction server 114 is further configured to execute instructions programmed to: determine the fact that the user associated with the digital object belongs to the first portion of users of the auction service; and in response to such a determination, to apply the second optimal value of the auction parameter for the digital object.

Given architecture of the system 100, shown in FIG. 1 and examples described herein above, a method of determining an optimal value of an auction parameter for a digital object can be executed. The method can be executed by the auction server 114. It should be recalled that the auction server 114 is associated with at least one storage 116. At least one auction service is hosted at the auction server 114. As it was mentioned above, an auction service is a computer program and can include, without being limitative, on-line services for selling goods and services and/or on-line services of contextually targeted ads, in which services a payment (for example, so-called pay-per-click) for placing ads is defined by an auction process. The auction service, in particular, is responsible for: providing the requested information to the user of the electronic device 102 in response to requests sent from the electronic device 102; placing a digital object; storing the interaction history data in the storage 116.

Figure 2:
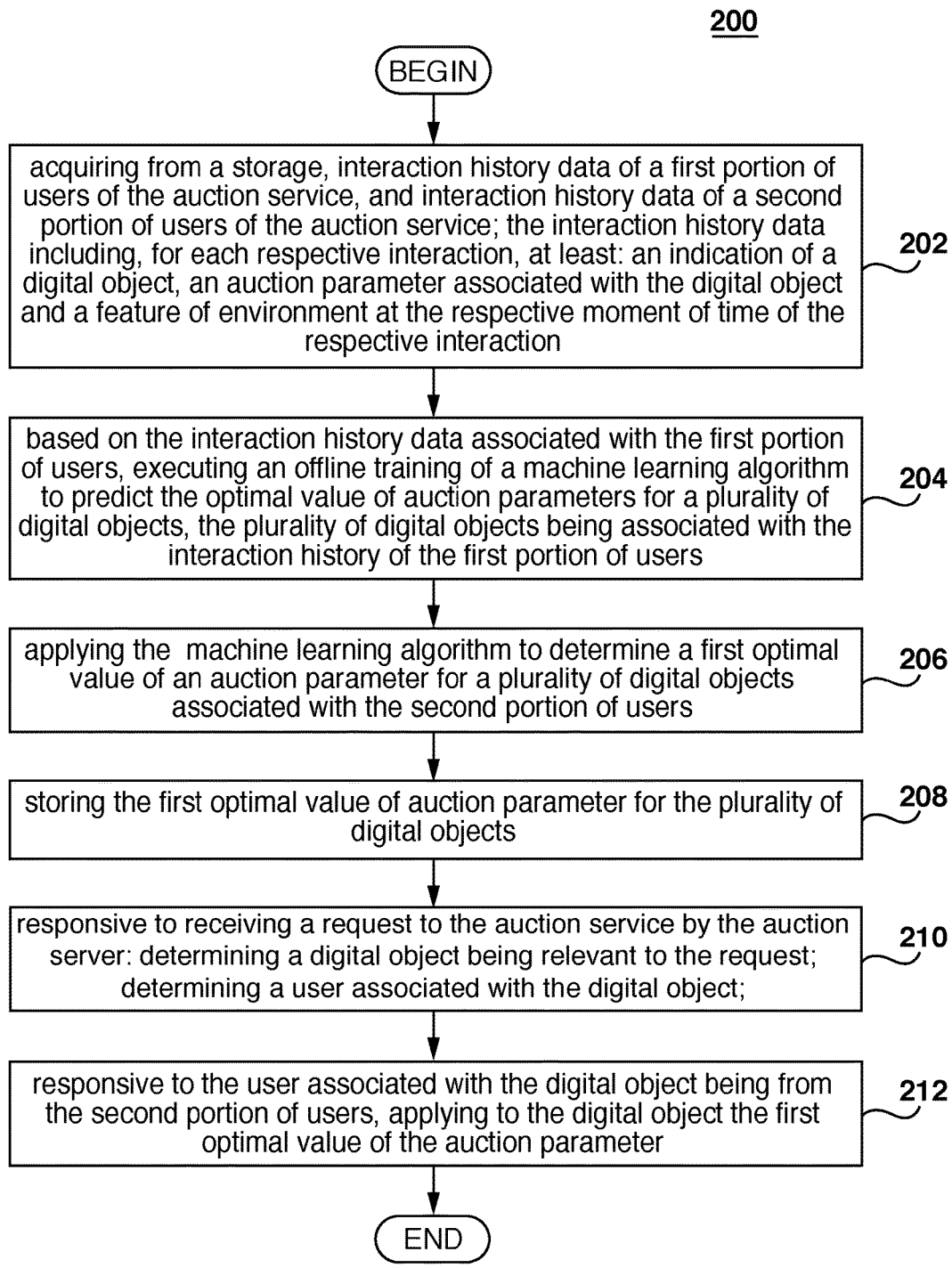
FIG. 2 depicts a block diagram of a method, showing the method being executable within the system of FIG. 1 and being implemented in accordance with non-limiting embodiments of the present technology.

FIG. 2 depicts a block diagram of a method 200 being executable in accordance with non-limiting embodiments of the present technology.

Step 202—Acquiring from the Storage Interaction History Data of a First Portion of Users of the Auction Service, and Interaction History Data of a Second Portion of Users of the Auction Service.

The method 200 begins at step 202, where the auction server 114 acquires, from the storage 116, interaction history data of a first and a second portions of users of the auction service.

In some implementations of the present technology, at the step of acquiring interaction history data a minimal number of users in the first portion of users of the auction service is further set.

In some implementations of the present technology, at the step of acquiring interaction history data a minimal number of users in the second portion of users of the auction service is further set.

In some implementations of the present technology, the number of users in the first portion of users of the auction service is equal to the amount of users in the second portion.

In some implementations of the present technology, at the step of acquiring interaction history data the first and the second portions are presented as a single group of users of the auction service, and prior to a step of executing an offline training of the machine learning algorithm, the single group of users is being divided into the first portion of users of the auction service and the second portion of users of the auction service.

In the illustrative example of FIG. 3, the interaction history data of the first portion of users of the auction service is separated from the interaction history data of the second portion of users of the auction service and are stored in the table 302 and the 304 correspondingly. However, in other implementations of the present technology these data can be stored in the database 300 as a single table for a single group of users. In such a case the auction server 114 acquires the interaction history data of the single group of users, then prior to the step of executing the offline training of the machine learning algorithm, the single group of users is divided by the auction server 114 into the first portion of users of the auction service and the second portion of users of the auction service.

A principle of division of the single group of users used by the auction server divide the single group into the first and the second portions of users of the auction server is not particularly limited. Thus, for example, the users can be divided randomly to form equal or non-equal numbers of users or in a pre-defined order, for example, as odd and even users.

In some implementations of the method 200, the method 200 further includes: prior to the step of offline training the machine learning algorithm, dividing a plurality of digital objects into at least two categories and dividing the first and the second portions of users of the auction service into subsets according to corresponding categories.

In some implementations of the present technology, a minimal number of users in each subset is pre-set.

In some implementations of the present technology, responsive to the number of users in a subset being fewer than the pre-set minimal value, the step of executing the offline training of the machine learning algorithm is performed based on the first portion of users.

For each user of the auction service, data of his or her interactions with the auction service is stored in the database in the storage 116. With the reference to FIG. 3 the interaction history data of the first portion of users of the auction service (the table 302) and the interaction history data of the second portion of users of the auction service (table 304) are stored in the database 300. The first portion of users includes four users: 3102, 3104, 3106, and 3108. The second portion of users includes three users: 3112, 3114, and 3116. As it was described herein above, the given example is an illustrative implementation of the present technology and a number of users in each portion can be more or fewer than the number of users shown in FIG. 3.

In FIG. 3 the tables 302 and 304 include an example of data for an auction of contextual ads.

Figure 4:
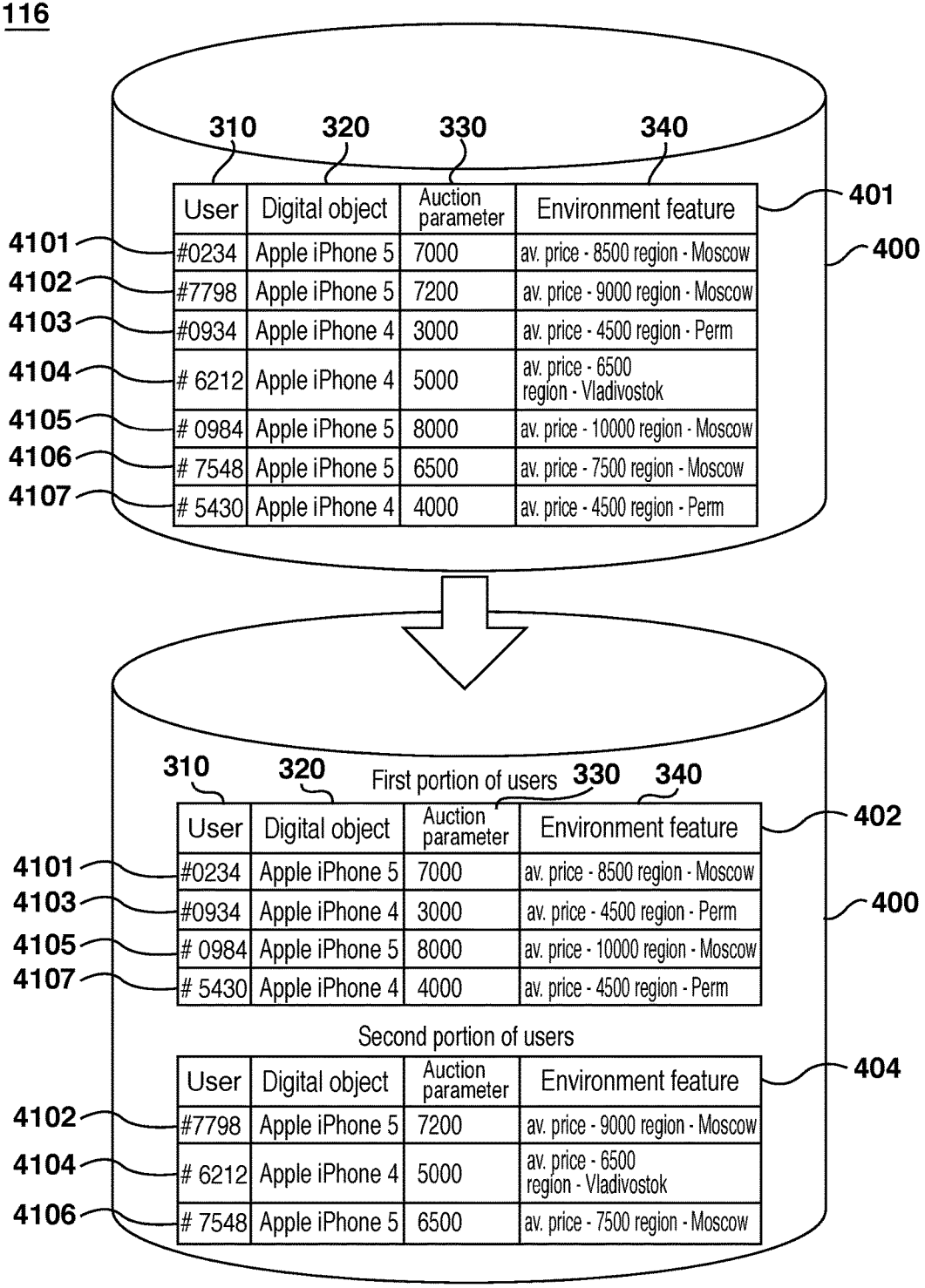
FIG. 4 is an illustrative example of an implementation of a storage for a case of an on-line auction for goods, the storage being part of the system of FIG. 1, the storage being implemented in accordance with some non-limiting embodiments of the present technology.

As one of possible alternative in FIG. 4 an illustrative example of an implementation of a storage 116 for a case of an on-line auction for selling various goods is shown. Similarly as is in case of the database 300 (FIG. 3), the storage 116 in FIG. 4 includes the database 400. The database 400 includes interaction history data as a single table 401 without division into a first and a second portions of users of the auction service. Generally, the table 401 (likewise tables 302 and 304 in FIG. 3) shows user ID 310 and at least three parameters of a user interaction history: an indication of a digital object 320, an auction parameter 330 and an environment feature 340.

In accordance with certain embodiments of the present technology, the interaction history data may include at least three parameters: the indication of the digital object 320, the auction parameter 330 associated with the digital object and the environment feature 340 at the respective moment of time. As is shown in FIG. 3, the user 3104 in the first portion of users and the user 3116 in the second portion of users have incomplete interaction history data (they do not have all three parameters listed above). Thus, the interaction history data of users 3104 and 3116 may be ignored (i.e. it may not be taken into account at the step of executing the offline training of the machine learning algorithm).

According to the table 401 in FIG. 4, the user 4102 and the user 4105 have incomplete interaction history data (they do not have all three parameters listed above). Thus, the interaction history data of users 4102 and 4105 may be ignored at the step of executing the offline training of the machine learning algorithm.

In some implementations of the present technology, the interaction history data further includes a spatial position of the digital object at a screen of a computer device.

In some implementations of the present technology, the interaction history data further includes an indicator of a type of the digital object.

In some implementations of the present technology, the type of the digital object can be: a text, an image, a video, an animation, a button, a form, a hyperlink, an interactive element or a combination thereof.

In some implementations of the present technology, the interaction history data further includes a history of changes of at least one auction parameter over time.

Accordingly, returning to the examples of FIG. 3 and FIG. 4 the tables 302 and 304, and 401 can include additional columns (in addition to the columns 310, 320, 330, and 340); these additional columns may have additional parameters of interaction history data for a portion of users. These additional parameters of the interaction history data may be taken into account in implementations of the present technology when dividing the plurality of digital objects at least into two categories and dividing the first and the second portion of users of the on-line auction into subsets of users using corresponding categories and/or at step of offline training the machine learning algorithm. In some embodiments of the present technology, these additional parameters of interaction history data can be taken into account only in case when the interaction history data of this user has the indication of the digital object 320, the auction parameter 330 associated with the digital object and the environment feature 340 at the respective moment of time.

In some embodiments of the present technology, the environment feature 340 can include at least one of: an average bid, 90% bid quantile, a minimum bid, a maximum bid, a value of probability of a click on the digital object, a relevancy score of the digital object to a search query (relevance score), an indication of a geographical area, and a search query, in response to which the digital object was shown.

In the example of FIG. 3, the database 300 includes the interaction history data of the first and the second portion of users who are located in the corresponding tables 302 and 304. From the first portion of users for the step of executing the offline training, the interaction history data of three users (3102, 3106 and 3108) will be taken into account. From the second portion of users for the step of executing the offline training, interaction history data of two users (3112 and 3114) will be taken into account.

In the example of FIG. 4, the database 400 includes the interaction history data of the first and the second portion of users who are located in the single table 401. In other words, users are not divided into two portions.

To perform the next steps of the method in accordance with the present technology, the auction server 114 performs dividing the single portion of users into a first and a second portions of users in the storage 116. As was mentioned above, the division can be executed randomly. As is shown in FIG. 4, the table 401 is divided into two tables 402 and 404, which correspond to the first and the second portions of users. In the provided example, the table 402 stores the interaction history data of the first portion of users (the first portion of users was generated in a manner mentioned above): 4101, 4103, 4105 and 4107, and the table 402 stores interaction history data of the second portion of users (the second portion of users was generated in a manner mentioned above): 4102, 4104, and 4106.

From the first portion of users for the step of executing the offline training, the interaction history data of three users (4101, 4103 and 4107) will be taken into account. From the second portion of users for the step of offline training, the interaction history data of two users (4104 and 4106) will be taken into account.

The method 200 then proceeds to step 204.

Step 204—Based on the Interaction History Data Associated with the First Portion of Users Offline Training a Machine Learning Algorithm to Predict an Optimal Value of Auction Parameters for a Plurality of Digital Objects, the Plurality of Digital Objects being Associated with the Interaction History of the First Portion of Users.

At step 204, based on the acquired interaction history data the auction server 114 executes the offline training of a machine learning algorithm via a training system 118. Based on the interaction history data associated with the first portion of users the auction server 114 executes the offline training of the machine learning algorithm to predict the optimal value of auction parameters.

Thus, in the illustrative example of FIG. 3, based on the interaction history data associated with users 3102, 3106 and 3108 from the first portion of users, the auction server 114 executes the offline training of the machine learning algorithm via the training system 118 to predict the optimal value of auction parameters for a plurality of digital objects. As was mentioned above, the interaction history data of the user 3104 may be ignored at this step, as this data is incomplete.

Thus, in the illustrative example of FIG. 4, based on the interaction history data associated with users 4101, 4103 and 4107 from the first portion of users the auction server 114 executes the offline training of the machine learning algorithm via the training system 118 to predict the optimal value of auction parameters for a plurality of digital objects. As it was mentioned above, the interaction history data of the user 4105 may be ignored at this step, as this data is incomplete.

In some implementations, the method 200 further includes: based on the interaction history data associated with the second portion of users, executing the offline training of the machine learning algorithm to predict the optimal value of auction parameters for a plurality of digital objects, the plurality of digital objects being associated with the interaction history of the second portion of users.

Similarly, for the example of FIG. 3, based on the interaction history data associated with the users 3112 and 3114 from the second portion of users the auction server 114 can execute the offline training of the machine learning algorithm via the training system 118 to predict the optimal value of auction parameters for a plurality of digital objects. As was mentioned above, the interaction history data associated with the user 3116 may be ignored at this step, as this data is incomplete.

In the example of FIG. 4, based on the interaction history data associated with the users 4104 and 4106 from the second portion of users the auction server 114 can execute the offline training of the machine learning algorithm via the training system 118 to predict the optimal value of auction parameters for a plurality of digital objects. As was mentioned above, the interaction history data associated with the user 4102 may be ignored at this step, as this data is incomplete.

In some embodiments of the resent technology, the executing the offline machine learning algorithm (once trained) is configured to predict an optimal value of at least one of the following auction parameters: a minimal placing price, an amnesty threshold for an advertiser. This alternative is characteristic of the case of auctions of contextual ads.

In some implementations of the present technology, based on the interaction history data associated with each distinct subset of the first portion of users, offline training the machine learning algorithm is further performed.

The method proceeds then to step 206.

Step 206—Applying the Offline Machine Learning Algorithm to Determine a First Optimal Value of an Auction Parameter for a Plurality of Digital Objects Associated with the Second Portion of Users At step 206, via a determination module 120, the auction server 114 applies the offline machine learning algorithm to determine a first optimal value of an auction parameter for a plurality of digital objects associated with the second portion of users.

Thus, in the example of FIG. 3, the offline machine learning algorithm, trained to predict the optimal value of auction parameters for the plurality of digital objects, the training being based on the interaction history data associated with users 3102, 3106 and 3108 from the first portion of users, is applied to determine the first optimal value associated with the users 3112 and 3114 associated with the second portion of users. Again, the interaction history data associated with the user 3116 may be ignored at this step, as this data is incomplete.

Similarly, in the example of FIG. 4, the offline machine learning algorithm, trained to predict the optimal value of auction parameters for the plurality of digital objects, the training being based on the interaction history data associated with users 4101, 4103 and 4107 from the first portion of users, is applied to determine the first optimal value associated with the users 4104 and 4106 associated with the second portion of users. Again, the interaction history data associated with the user 4102 may be ignored at this step, as this data is incomplete.

In some implementations of the present technology, the offline machine learning algorithm is further applied to determine the second optimal value of the auction parameter for the plurality of digital objects associated with the first portion of users.

In the example of FIG. 3 the offline machine learning algorithm, trained to predict the optimal value of auction parameters for the plurality of digital objects, the training being based on the interaction history data associated with users 3112 and 3114 from the second portion of users, is applied to determine the second optimal value associated with the users 3102, 3106 and 3108 associated with the first portion of users. Again, the interaction history data associated with the user 3104 are may be ignored at this step, as this data is incomplete.

Similarly, in the example of FIG. 4 the offline machine learning algorithm, trained to predict the optimal value of auction parameters for the plurality of digital objects, the training being based on the interaction history data associated with users 4104 and 4106 from the second portion of users, is applied to determine the second optimal value associated with the users 4101, 4103 and 4107 associated with the first portion of users. Again, the interaction history data associated with the user 4105 may be ignored at this step, as this data is incomplete.

In some implementations of the present technology, the offline machine learning algorithm is further applied to determine the first optimal value of the auction parameter for the plurality of digital objects associated with a corresponding subset of the second portion of users.

The method proceeds then to step 208.

Step 208—Storing the First Optimal Value of the Auction Parameter for a Plurality of Digital Objects.

At step 208, via the determination module 120, the auction server 114 stores in the storage 116 the first optimal value of the auction parameter for the plurality of digital objects.

In some implementations of the present technology storing the second optimal value of the auction parameter for the plurality of digital objects is further performed.

It should be noted that executing steps 202-208 can be performed during periods with the minimal load for a system, for example, nightly, when a number of user is minimal.

In some implementations of the present technology, after storing the first optimal value of the auction parameter for the plurality of the digital objects, updating the said optimal value is performed by periodical repetition of steps of the method 200.

In some implementations of the present technology, after storing the second optimal value of the auction parameter for the plurality of the digital objects, updating the said optimal value is performed by periodical repetition of steps of the method.

A period of the repetition of steps of the method can be, for example, but without being limitative, as follows: few days, a week, a month and the like. For some cases it can be useful to update the optimal value of the auction parameter daily.

Step 210—in Response to Receiving a Request for an Auction Service by the Auction Server: Determining a Digital Object being Relevant to the Request; Determining a User Associated with the Digital Object.

At step 210, via the communication network 108, the auction server 114 receives a request for an auction service from the electronic device 102. In case of an auction of goods and services it can be a request to include a new digital object (for example, a description and photos of an offered good) in the auction. In case of an auction of contextual ads it can be, for example, a request to include a new digital object (for example, a textual ad) in the auction service to display the digital object (the ad) on a search engine result page SERP.

The auction server 114 performs determining a digital object being relevant to the request in the storage 116. Let us say, the request of the user of the electronic device 102 includes an indication to a digital object "Apple Iphone 5S". The database 400 in FIG. 4 includes the interaction history data of users from the first and the second portions, the data being associated with a relevant digital object.

The auction server 114 performs determining a user being associated with the digital object. In case the user of the electronic device 102 that has sent the request to place the new digital object is present in one of the portions of users of the auction service, the auction server 114 determines a portion the user belongs to. Let's assume that it is the user 4101 from the second portion of users.

In an alternative implementation the user can belong to neither portion of users. In this case the auction server 114 assigns a new user to one of the portions of users, let us say, to the second portion. It is obvious that for the new user there is no history data of user interactions with the auction server.

Step 212—Responsive to the User Associated with the Digital Object being from the Second Portion of Users Applying for the Digital Object the First Optimal Value of the Auction Parameter.

At step 212 in case the user belongs to the second portion of users, the auction server 114 performs applying for the digital object the first optimal value of the auction parameter.

In alternative implementation of the present technology in case the user belongs to the first portion of users, the auction server 114 performs applying for the digital object the second optimal value of the auction parameter.

Returning to the example described herein above, after determining by the auction server 114 the user who has sent the request being the user 4104 from the second portion, the auction server 114 performs applying for the digital object from the user request the first optimal value of the auction parameter.

After executing step 212 the method terminates.

The proposed method and system of determining an optimal value of an auction parameter for a digital object allow reducing the server load in comparison with known algorithms.

Modifications and improvements to the above-described embodiments of the present technology may become apparent to those skilled in the art. The following description is illustrative only and is not intended to be in any way limiting. Thus, the scope of present technology is limited by the scope of the appended claims only.

As such, from one perspective, embodiments of the present technology can be summarized as follows, structured in numbered clauses.

The invention claimed is:

1. A method of determining an optimal value of an auction parameter for a digital object; the method executable at an auction server, associated with the storage; the auction server hosting an auction service, the method comprising:
acquiring from a storage, interaction history data of a first portion of users of the auction service, and interaction history data of a second portion of users of the auction service; the interaction history data including, for each respective interaction, at least: an indication of a digital object, an auction parameter associated with the digital object and an environment feature at a respective moment of time of the respective interaction;
based on the interaction history data associated with the first portion of users, executing an offline training of a machine learning algorithm to predict the optimal value of auction parameters for a plurality of digital objects, the plurality of digital objects being associated with the interaction history of the first portion of users;
applying the machine learning algorithm to determine a first optimal value of an auction parameter for a plurality of digital objects associated with the second portion of users;
storing the first optimal value of auction parameter for the plurality of digital objects;
responsive to receiving a request to the auction service by the auction server,
determining a digital object being relevant to the request;
determining a user associated with the digital object;
responsive to the user associated with the digital object being from the second portion of users, applying to the digital object the first optimal value of the auction parameter.

2. The method of claim 1, further comprising setting a minimal number of users in the first portion of users of the auction service for the acquiring interaction history data.

3. The method of claim 1, further comprising setting a minimal number of users in the second portion of users of the auction service for the acquiring interaction history data.

4. The method of claim 1, wherein the number of users in the first portion of users of the auction service is equal to the number of users in the second portion.

5. The method of claim 1, wherein during the acquiring interaction history data, the first and the second portions are presented as a single group of users of the auction service, and wherein prior to the executing the offline training of the machine learning algorithm, the single group of users is divided into the first portion of users of the auction service and the second portion of users of the auction service.

6. The method of claim 1, further comprising:
prior to the executing the offline training of the machine learning algorithm, dividing a plurality of digital objects into at least two categories and dividing the first and the second portions of users of the auction service into subsets according to corresponding at least two categories; and wherein
the executing the offline training of the machine learning algorithm is based on the interaction history data associated with each distinct subset of the first portion of users;
applying the machine learning algorithm to determine a first optimal value of auction parameter for each category of a plurality of digital objects associated with a corresponding subset of the second portion of users;
upon receiving by the auction server a request to the auction service responsive to the user associated with the digital object being from the subset of the second portion of users, applying for the digital object the first optimal value of the auction parameter, corresponding to the digital object category.

7. The method of claim 6, further comprising pre-setting a minimal number of users in each subset.

8. The method of claim 7, wherein responsive to the number of users in a subset being less than the pre-set minimal value, executing the offline training of the machine learning algorithm is performed using the portion of users.

9. The method of claim 1, wherein the storage includes a plurality of interaction history data for a plurality of users, and wherein the acquiring interaction history data comprises acquiring a sub-set of data generated at a pre-defined time period, the sub-set of data including for each respective interaction at least: the indication of the digital object, the auction parameter associated with the digital object and the environment feature at the respective moment of time of the respective interaction.

10. The method of claim 1, wherein the interaction history data further includes a spatial position of the digital object at a screen of a computer device.

11. The method of claim 1, wherein the interaction history data further includes an indication of a type of the digital object.

12. The method of claim 11, wherein the type of the digital object is at least one of: a text, an image, a video, an animation, a button, a form, a hyperlink, an interactive element.

13. The method of claim 1, wherein the interaction history data further includes a history of changes of at least one auction parameter over time.

14. The method of claim 1, wherein feature of environment includes at least one of: an average bid, 90% bid quantile, a minimal bid, a maximal bid, a probability of a click on the digital object, a relevancy score of the digital object to a search query, an indication of a geographical area, and a search query, in response to which the digital object was shown.

15. The method of claim 1, wherein the machine learning algorithm is configured to predict an optimal value of at least one of: a minimal placing price of the auction parameters, and an amnesty threshold for an advertiser.

16. The method of claim 1, wherein after storing the first optimal value of the auction parameter for the plurality of the digital objects, the method further comprises updating the optimal value by periodical repetition of steps of the method of claim 1.

17. The method of claim 1, further comprising:
based on the interaction history data associated with the second portion of users, executing training of the machine learning algorithm to predict the optimal value of auction parameters for a plurality of digital objects, the plurality of digital objects being associated with the interaction history of the second portion of users;
applying the machine learning algorithm to determine a second optimal value of the auction parameter for the plurality of digital objects associated with the first portion of users;
storing the second optimal value of the auction parameter for the plurality of digital objects.

18. The method of claim 17, wherein responsive to the user associated with the digital object being from the first portion of users, the method further comprises applying to the digital object the second optimal value of the auction parameter.

19. The method of claim 17, wherein after storing the second optimal value of the auction parameter for the plurality of the digital objects, the method further comprises updating the optimal value by periodical repetition of steps of the method of claim 17.

\* \* \* \* \*